US006664654B2

(12) United States Patent
Wall et al.

(10) Patent No.: US 6,664,654 B2
(45) Date of Patent: Dec. 16, 2003

(54) SYSTEM AND METHOD FOR DUAL MODE CONTROL OF A TURBOGENERATOR/MOTOR

(75) Inventors: Simon R. Wall, Thousand Oaks, CA (US); Joel B. Wacknov, Thousand Oaks, CA (US); Mark G. Gilbreth, Simi Valley, CA (US); Ken Keller, Reseda, CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 43 days.

(21) Appl. No.: 10/158,095

(22) Filed: May 29, 2002

(65) Prior Publication Data
US 2002/0140234 A1 Oct. 3, 2002

Related U.S. Application Data

(63) Continuation of application No. 09/644,527, filed on Aug. 23, 2000, now Pat. No. 6,410,992.

(51) Int. Cl.$^7$ ............................... H02P 9/00; F02N 11/00
(52) U.S. Cl. ............................... 290/52; 322/20; 307/70
(58) Field of Search ........................... 290/40 R, 40 C, 290/52; 322/20, 36; 307/70, 85

(56) References Cited

U.S. PATENT DOCUMENTS

| 2,917,635 | A | 12/1959 | Bloom | 290/30 |
|---|---|---|---|---|
| 2,920,211 | A | 1/1960 | Gotoh | 290/30 |
| 3,151,250 | A | 9/1964 | Carlson | 290/30 |
| 3,221,172 | A | 11/1965 | Rolison | 290/30 |
| 3,678,284 | A | 7/1972 | Peters | 290/1 |
| 4,021,704 | A | 5/1977 | Norbeck | 361/77 |
| 4,460,834 | A | 7/1984 | Gottfried | 307/64 |
| 4,469,954 | A | 9/1984 | Maehara | 290/1 A |
| 4,647,834 | A | 3/1987 | Castleman | 320/43 |
| 4,731,547 | A | 3/1988 | Alenduff | 307/85 |
| 4,827,152 | A | 5/1989 | Farkas | 307/68 |

(List continued on next page.)

Primary Examiner—Nicholas Ponomarenko
(74) Attorney, Agent, or Firm—Sterne, Kessler, Goldstein & Fox P.L.L.C.

(57) ABSTRACT

A method of controlling a permanent magnet turbogenerator/motor includes providing a protected load connected in parallel with the turbogenerator/motor through a pulse width modulated inverter configured in a first operating mode to supply controlled current from the turbogenerator/motor to a utility electrical power source, and selectively connected to the utility electrical power source through an isolation device, monitoring the utility electrical power source, and automatically disconnecting the protected load from the utility electrical power source while reconfiguring the pulse width modulated inverter in a second operating mode to supply controlled voltage to the protected load when a fault is detected in the utility electrical power source. The present invention provides an external or integrated dual mode controller which can be used to provide automatic transitions of a turbogenerator/motor between grid-connected modes where a PWM inverter provides a controlled AC current source to stand-alone modes where the PWM inverter provides a controlled AC voltage source to a protected load. Three phase rotation sequence can be set to positive or negative rotation, or be set to the last measured rotation for the utility grid to enable automatic transitions from stand-alone to grid-connect modes. In addition, the present invention provides for detecting a reference phase angle of the three-phase power provided by a utility grid such that gradual synchronization/resynchronization of a protected parallel connected load can be performed by appropriately controlling the PWM inverter prior to re-connection to the utility grid.

17 Claims, 10 Drawing Sheets

U.S. PATENT DOCUMENTS

| | | | |
|---|---|---|---|
| 5,084,825 A | 1/1992 | Kelly | 364/507 |
| 5,166,595 A | 11/1992 | Leverich | 320/32 |
| 5,321,308 A | 6/1994 | Johncock | 290/40 C |
| 5,408,821 A | 4/1995 | Romero | 60/390.02 |
| 5,440,221 A | 8/1995 | Landau | 320/22 |
| 5,592,067 A | 1/1997 | Peter | 320/15 |
| 5,594,320 A | 1/1997 | Pacholok | 320/4 |
| 5,635,768 A | 6/1997 | Birch | 290/40 C |
| 5,644,209 A | 7/1997 | Chabbert | 320/15 |
| 5,666,041 A | 9/1997 | Stuart | 320/15 |
| 5,767,660 A | 6/1998 | Schmidt | 320/10 |
| 5,791,868 A | 8/1998 | Bosley et al. | 415/104 |
| 5,819,524 A * | 10/1998 | Bosley et al. | 60/39.465 |
| 5,850,733 A * | 12/1998 | Bosley et al. | 60/39.464 |
| 5,899,673 A | 5/1999 | Bosley | 417/423.14 |
| 5,903,116 A | 5/1999 | Geis et al. | 318/140 |
| 5,965,996 A | 10/1999 | Arledge | 320/116 |
| 5,982,143 A | 11/1999 | Stuart | 320/119 |
| 6,018,200 A | 1/2000 | Anderson | 290/40 B |
| 6,020,713 A | 2/2000 | Geis | 318/801 |
| 6,023,135 A | 2/2000 | Gilbreth et al. | 318/140 |
| 6,031,294 A | 2/2000 | Geis et al. | 290/52 |
| 6,070,404 A * | 6/2000 | Bosley et al. | 60/772 |
| 6,693,975 * | 7/2000 | Peticolas | 290/52 |
| 6,169,334 B1 * | 1/2001 | Edelman | 290/52 |
| 6,194,794 B1 | 2/2001 | Lampe et al. | 307/68 |
| 6,265,786 B1 * | 7/2001 | Bosley et al. | 290/52 |
| 6,274,945 B1 * | 8/2001 | Gilbreth et al. | 290/52 |
| 6,281,596 B1 * | 8/2001 | Gilbreth et al. | 290/52 |
| 6,325,142 B1 * | 12/2001 | Bosley et al. | 166/53 |
| 6,410,992 B1 * | 6/2002 | Wall et al. | 290/52 |
| 2001/0030425 A1 * | 10/2001 | Gilbreth et al. | 290/52 |
| 2001/0052704 A1 * | 12/2001 | Bosley et al. | 290/52 |
| 2002/0005643 A1 * | 1/2002 | Gilbreth et al. | 290/52 |
| 2002/0030364 A1 * | 3/2002 | Bosley et al. | 290/7 |
| 2002/0059791 A1 * | 5/2002 | Willis et al. | 60/39.094 |
| 2002/0060556 A1 * | 5/2002 | Wall | 322/29 |
| 2002/0074804 A1 * | 6/2002 | Gilbreth et al. | 290/52 |
| 2002/0140234 A1 * | 10/2002 | Wall et al. | 290/52 |
| 2002/0149206 A1 * | 10/2002 | Gilbreth et al. | 290/52 |

* cited by examiner

SYSTEM AND METHOD FOR DUAL MODE CONTROL OF A TURBOGENERATOR/ MOTOR

This is a continuation application of U.S. Ser. No. 09/644,527 filed on Aug. 23, 2000 now U.S. Pat. No. 6,410,992, now allowed.

TECHNICAL FIELD

The present invention relates to a system and method for controlling a turbogenerator/motor to provide automated or semi-automated transitions between grid following and stand-alone operating modes.

BACKGROUND ART

A permanent magnet generator/motor generally includes a rotor assembly having a plurality of equally spaced magnet poles of alternating polarity around the outer periphery of the rotor or, in more recent times, a solid structure of samarium cobalt or neodymium-iron-boron. The rotor is rotatable within a stator which generally includes a plurality of windings and magnetic poles of alternating polarity. In a generator mode, rotation of the rotor causes the permanent magnets to pass by the stator poles and coils and thereby induces an electric current to flow in each of the coils. Alternatively, if an electric current is passed through the stator coils, the energized coils will cause the rotor to rotate and thus the generator will perform as a motor.

One of the applications of a permanent magnet generator/motor is referred to as a turbogenerator which includes a power head mounted on the same shaft as the permanent magnet generator/motor, and also includes a combustor and recuperator. The turbogenerator power head would normally include a compressor, a gas turbine and a bearing rotor through which the permanent magnet generator/motor tie rod passes. The compressor is driven by the gas turbine which receives heated exhaust gases from the combustor supplied with preheated air from the recuperator.

A permanent magnet turbogenerator/motor can be utilized to provide electrical power for a wide range of utility, commercial, and industrial applications. While an individual permanent magnet turbogenerator may only generate 24 to 75 kilowatts, powerplants of up to 1000 kilowatts or greater are possible by linking numerous permanent magnet turbogenerator/motors together. Potential applications for these lightweight, low noise, low cost, environmentally friendly, and thermally efficient units include standby power, peak load shaving power, and remote location power, among others.

When operating in a grid connected mode, the turbogenerator system is generating power in parallel with a utility grid. In this mode, the system may act as a current source, or alternatively as a voltage source with series impedance. When generating power in parallel with the utility, various protective functions or features should be provided to assure the safety of utility workers and others who interface with the utility grid. For example, features should be provided to disconnect the turbogenerator system from the utility grid when abnormal conditions occur on the grid system, particularly when the section of the grid to which the turbogenerator system is connected becomes isolated from the remainder of the utility system. This condition is sometimes referred to as "islanded operation" and should be avoided because utility workers normally expect the voltage to collapse when they disconnect a grid section from the remainder of the utility. If this does not occur as expected, and the utility workers do not follow proper safety procedures such as measuring the voltage and applying grounds before touching conductors, islanded operation may result in a safety risk. Another safety risk is that a generator will start up and energize a de-energized section of the grid with which utility workers may be in contact.

When operating in stand alone mode, the turbogenerator system is generating power to supply loads that are isolated from the utility grid. The system will generally operate as a voltage source in this mode although other configurations are possible. In stand alone mode, the protective features used in grid connect mode should be disabled because the system is essentially operating in an islanded condition and energizes a de-energized line. However, various other features may be desirable, such as avoiding energizing a line that is already energized so that stand alone controls can not be activated when connected to a utility grid.

A gas turbine is an inherently limited thermal machine from the standpoint of its ability to change rapidly from one load state to a different load state. In terms of accepting increased loading, the gas turbine has a limited capability or slew rate which may depend upon the particular application. As one example, a turbogenerator may be able to support an increasing load at a rate of about two (2) kilowatts per second. This creates problems in many stand-alone applications where the load may be essentially instantaneously applied in as little as about one millisecond. Similar limitations apply to decreasing loads as well. When operating in a self-sustained manner, the gas turbine has a very large amount of stored energy, primarily in the form of heat stored in the associated recuperator. If the load is removed from the gas turbine too quickly, this stored energy could result in overspeeding the turbine.

As such, various energy storage and discharge systems have been developed. The energy storage and discharge system includes an ancillary electric storage device, such as a battery, connected to the generator controller through control electronics. Electrical energy can flow from the ancillary electric storage device to the turbogenerator controller during start up and increasing load and vice versa during self-sustained operation of the turbogenerator. To start the turbine, a microprocessor-based inverter connects to and supplies fixed current, variable voltage, variable frequency, AC power to the permanent magnet turbogenerator/motor, driving the permanent magnet turbogenerator/motor as a motor to accelerate the gas turbine. When utility power is unavailable, the ancillary electric storage device can provide the power required to start the turbogenerator. As the turbine accelerates to an appropriate light-off speed, spark and fuel are introduced and self-sustaining gas turbine operating conditions are reached. When transitioning between stand alone and grid connect operating modes, proper phase synchronization may be necessary to avoid damaging equipment associated with the protected load.

When a load transient occurs in stand alone mode, the gas turbine engine and the ancillary electric storage device provide the power required to successfully meet the transient. The output power control regulates a constant AC voltage and any load placed on the output will immediately require more power to maintain the same level of AC voltage output. As this occurs, the internal DC bus may start to droop. In response, the ancillary electric storage device control draws current out of the storage device to regulate the DC bus voltage. As turbogenerator system power output increases, the gas turbine engine controls respond by commanding the gas turbine engine to a higher speed. When the power generated by the gas turbine engine meets or exceeds the current load, the ancillary storage device starts to draw power from the DC bus for future storage. Proper management of the ancillary storage device is necessary to assure stored energy availability for use during stand alone starts where utility power is not available, during transitions between grid connect and stand alone operating modes, and to accommodate transient load increases while maintaining acceptable energy storage component life.

DISCLOSURE OF INVENTION

The present invention provides systems and methods for controlling a turbogenerator to facilitate switching between a grid following operating mode and a stand-alone operating mode. A dual mode controller may by an external controller which communicates with the primary turbogenerator/motor controller via an appropriate communications interface to selectively and automatically reconfigure a PWM inverter from a grid-connect mode to a stand-alone mode based on availability or condition of utility grid power. Control commands and data/status information may be communicated between the turbogenerator/motor controller and the dual mode controller via serial communication interfaces (RS-485, Ethernet), logic signals, relays, contacts, and the like. In one embodiment, the dual mode controller is integrated into the turbogenerator/controller and may include the same or similar contacts for backward compatibility.

The present invention provides a dual mode controller for a turbogenerator which includes a rotation sequence selector which can automatically monitor the rotation sequence of three phase power from a utility grid and use the same rotation sequence when transitioning between grid-connect and stand-alone mode modes. Alternatively, or in combination, the present invention allows a user/operator to select a rotation sequence while operating in a manual stand-alone mode which may include a positive or negative sequence, or may use the last measured sequence for the utility grid. A default rotation sequence, either positive, negative, or grid, is also provided for automatic transitions between the grid-connect and stand-alone mode operation. In one embodiment, the present invention also provides for phase reference angle synchronization to synchronize the reference angle in stand-alone mode with the utility grid prior to completing the transition to grid-connect mode.

The present invention preferably includes an auxiliary electrical power storage and discharge system, such as one or more batteries, for providing a stand-alone start of the turbogenerator/motor without connection to a utility grid, for providing power to service transient loads, and/or for providing power to a protected load during transitions between grid-connect and stand-alone operating modes. Appropriate management of the auxiliary electrical power and discharge system may include periodic top-up charges, equalization charges, and recharges to assure power availability.

The present invention includes various safety features while transitioning between grid connect and stand-alone operating modes. For example, if an attempt is made to operating in grid connect mode when the connected load is actually a stand-alone, then the system inhibits starting to avoid safety hazards. If an attempt is made to operate in stand-alone mode when the system is connected so the utility grid and the grid is energized, the system will not start. The invention prevents the system from being configured in the stand-alone mode when it is connected to a utility grid by providing an appropriate lock-out system. An isolation device contains an auxiliary low voltage contact that always has the same position as the main power contacts. The system interfaces with this contact via stand-alone and grid-connect enable lines. When the switch is closed, the stand-alone enable is clear and the grid-connect enable is set. The invention opens the isolation device if the turbogenerator system enters the stand-alone state where the output is energized by using state feedback signals provided by the turbogenerator.

The present invention provides a number of advantages relative to prior art strategies. For example, the present invention can provide automatic or semiautomatic transitions between grid-connect and stand-alone operating modes with only momentary breaks or interruptions in supplying power to a protected load. The ability for rotation selection control of three-phase power generation in addition to phase synchronization provides for automatic transitions from stand-alone modes to grid-connect operating modes. In addition, rotation sequence control may by used to prevent equipment damage otherwise caused by a rotation sequence reversal when switching to stand-alone mode.

The above advantages and other advantages, objects, and features of the present invention, will be readily apparent from the following detailed description of the best mode for carrying out the invention when taken in connection with the accompanying drawings.

BEST MODE FOR CARRYING OUT THE INVENTION

Figure 1:
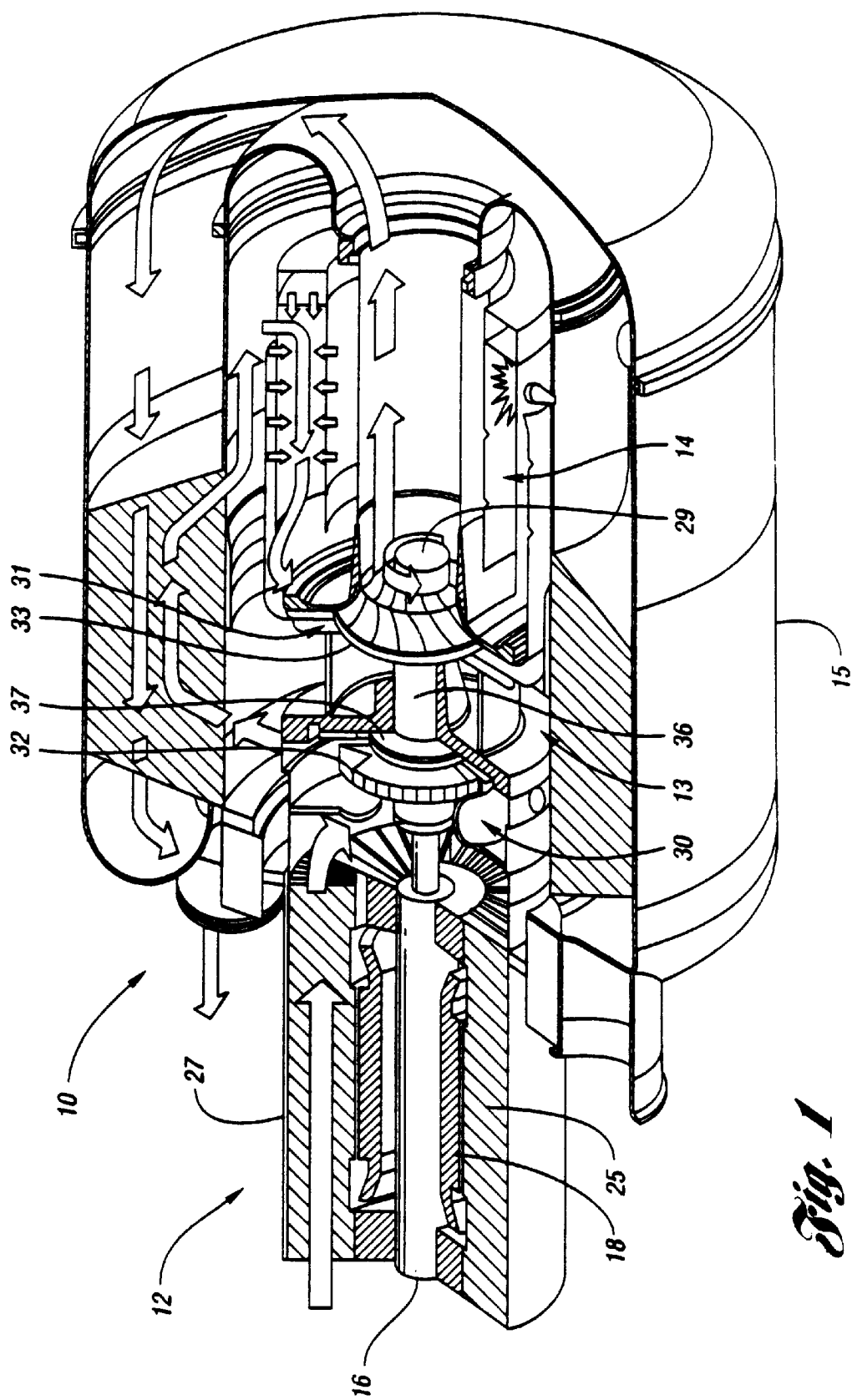
FIG. 1 is a partial cut-away view of a low emissions turbogenerator/motor for use with a dual mode control system or method according to the present invention.

A permanent magnet turbogenerator/motor 10 is illustrated in FIG. 1 as an example of a turbogenerator/motor for use with a system or method for dual mode control of the present invention. Permanent magnet turbogenerator/motor 10 generally comprises a permanent magnet generator 12, a power head 13, a combustor 14 and a recuperator (or heat exchanger) 15. Permanent magnet generator 12 includes a permanent magnet rotor or sleeve 16, having a permanent magnet disposed therein, rotatably supported within a stator 18 by a pair of spaced journal bearings. Radial stator cooling fins 25 are enclosed in an outer cylindrical sleeve 27 to form an annular air flow passage which cools the stator 18 and preheats the air passing toward power head 13.

Power head 13 of the permanent magnet turbogenerator/motor 10 includes compressor 30, turbine 31, and bearing rotor 36 through which tie rod 29 passes. Compressor 30, having compressor impeller or wheel 32 which receives preheated air from the annular air flow passage in cylindrical sleeve 27 around permanent magnet stator 18, is driven by turbine 31 having turbine wheel 33 which receives heated exhaust gases from combustor 14 supplied with air from recuperator 15. Compressor wheel 32 and turbine wheel 33 are rotatably supported by bearing shaft or rotor 36 having radially extending bearing rotor thrust disk 37. Bearing rotor 36 is rotatably supported by a single journal bearing within the center bearing housing while bearing rotor thrust disk 37 at the compressor end of bearing rotor 36 is rotatably supported by a bilateral thrust bearing. Bearing rotor thrust disk 37 is adjacent to the thrust face at the compressor end of the center bearing housing while a bearing thrust plate is disposed on the opposite side of bearing rotor thrust disk 37 relative to the center housing thrust face.

Intake air is drawn through permanent magnet generator 12 by compressor 30 which increases the pressure of the air and forces it into recuperator 15. In recuperator 15, exhaust heat from turbine 31 is used to preheat the air before it enters combustor 14 where the preheated air is mixed with fuel and burned. The combustion gases are then expanded in turbine 31 which drives compressor 30 and permanent magnet rotor 16 of permanent magnet generator 12 which is mounted on the same shaft as turbine 31. The expanded turbine exhaust gases are then passed through recuperator 15 before being discharged from turbogenerator/motor 10.

Turbogenerator/motor 10 produces voltage at variable voltage and variable frequency depending on the output power. However, the protected loads supplied by turbogenerator/motor 10 typically require a fixed supply voltage and frequency. As such, an electronic converter is used to match the variable voltage, variable frequency output of turbogenerator/motor 10 to the fixed voltage, fixed frequency requirements of the protected loads.

Figure 2:
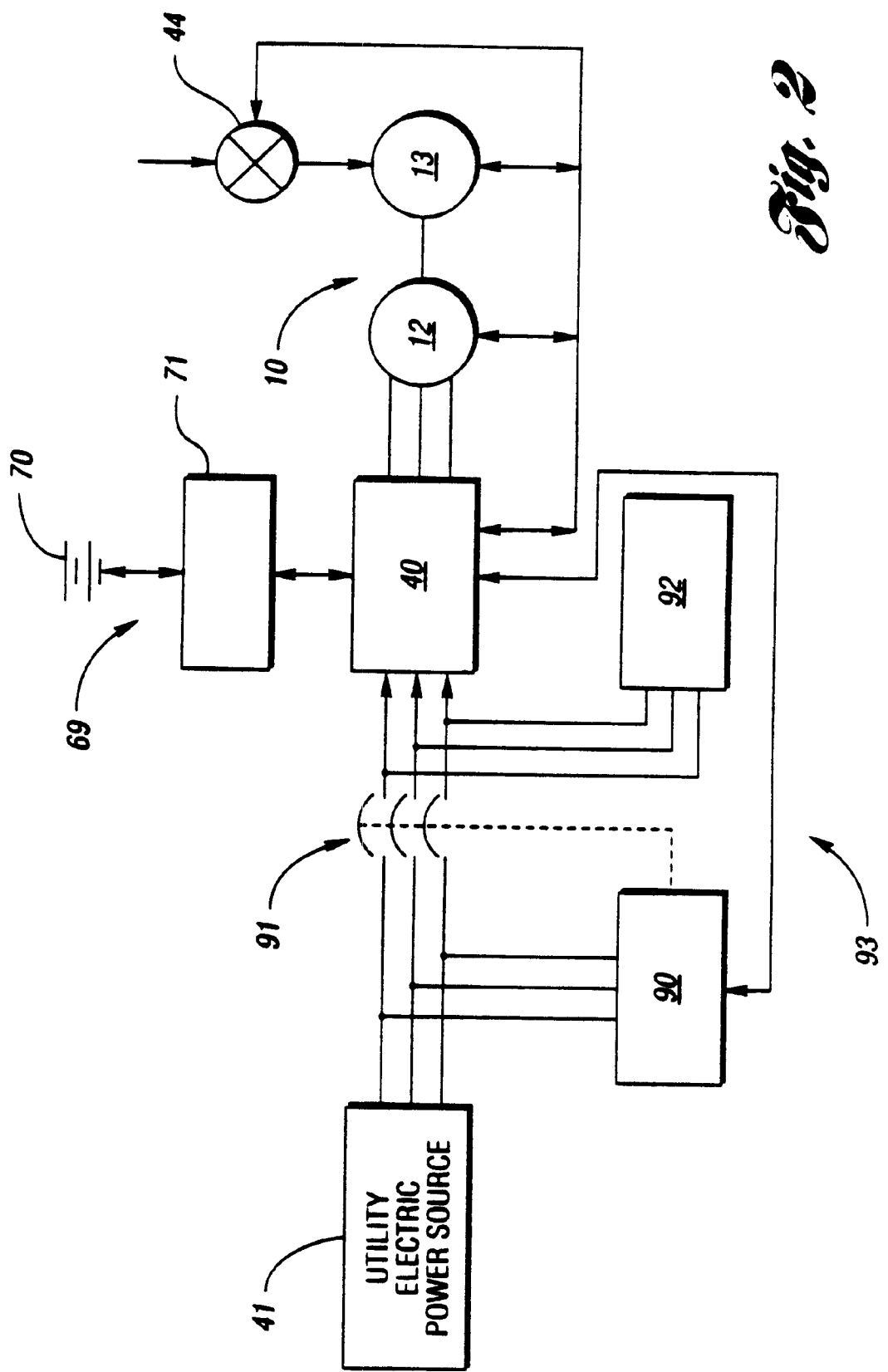
FIG. 2 is a block diagram of a control system for dual mode operation of a turbogenerator/motor according to the present invention.

A functional block diagram of the interface between generator controller 40, permanent magnet turbogenerator/motor 10, and a dual mode controller 90 according to the present invention is illustrated in FIG. 2. While illustrated as a separate functional block in the embodiment of FIG. 2, dual mode controller 90 may either be integrated as one or more subassemblies within the same physical packaging as generator controller 40, or be a stand alone controller which communicates via one or more logic/enable signals with generator 40 through connection 93. In one preferred embodiment according to the present invention, dual mode controller 90 communicates a grid connect enable signal, a stand-alone enable signal, a battery start signal and a system start/stop signal to generator controller 40 via appropriate logic signals as described in greater detail below. Generator controller 40 supplies state indications to dual mode controller 90 which may include standby, run, load, fault, stand-alone, and/or grid connect mode active states as illustrated and described with reference to FIGS. 5–10.

Dual mode controller 90 receives power from a source such as a utility grid. Dual mode controller 90 is operative to selectively connect power to generator 40 and parallel connected protected load 92 to the utility electrical power source 41 using a controllable isolation device 91. Dual mode controller 90 is operative to selectively connect power to generator 40 and parallel-connected protected load 92 using a controllable isolation device 91. Controllable isolation device 91 may be implemented using a contactor or a motorized circuit breaker, for example. Dual mode controller 90 operates controllable isolation device 91 based on information and command signals exchanged with generator controller 40 to control transitions between the dual mode stand-alone (SA) operating modes and the dual mode grid-connect (GC) operating modes. During operation in the dual mode SA modes, isolation device 91 is preferably opened to isolate protected load 92 from utility electrical power source 41. During operation in any of the dual mode GC modes, isolation device 91 is preferably closed and connects protected load 92 to utility electrical power source 41.

It should be recognized that the present invention also provides the capability to operate turbogenerator/motor 10 in conventional SA and GC operating modes in addition to the dual mode operation. That is, dual mode operation according to the present invention provides automatic or semi-automatic transitions between operation in the SA modes and operation in the GC modes. Dual mode controller 90 and/or generator controller 40 may also be configured manually to operate in either the SA modes or the GC modes without automatic transitions. Control of isolation device 91 may vary depending upon whether dual mode operation has been selected and configured as opposed to one or the other operating modes. Alternatively, under dual mode control, isolation device 91 is opened in SA modes and starting power must be provided by an ancillary or auxiliary storage device, such as a battery.

Reconfiguration of generator controller 40 according to some embodiments for dual mode control according to the present invention may include rotation sequence control. Rotation sequence control provides the ability to manually or automatically select a positive (L1, L2, L3) or negative (L1, L3, L2) rotation sequence for the three phase power output produced by generator control 40. Manual selection is only available in the SA operating modes. Automatic rotation sequence control is preferably provided by generator controller 40. In one embodiment, dual mode transitions to SA operating modes will examine an appropriate memory storage location to determine a desired rotation sequence for the SA modes. The system can preferably be configured to command a positive sequence, a negative sequence, or to provide the same sequence as detected on the utility grid in GC mode prior to transitioning to SA mode. The utility grid rotation sequence is monitored and periodically updated as required. If a valid rotation sequence has not been detected, a default value may be used. Use of the same rotation sequence in SA mode as that used in GC mode may prevent possible equipment damage for protected load 92 due to phase sequence reversal when transferring between utility grid and stand-by power. A detailed description of the rotation sequence feature of a dual mode controller according to the present invention is provided with reference to FIG. 4.

As illustrated schematically in FIG. 2, generator controller 40 also includes an energy storage and discharge system 69 having an ancillary electric storage device 70 which is connected through control electronics 71. This connection is bi-directional in that electrical energy can flow from ancillary electric storage device 70 to generator controller 40, during turbogenerator/motor start-up for example, and electrical energy can also be supplied from turbogenerator/motor controller 40 to ancillary electric storage device 70 during sustained operation to handle load transients as explained above. While ancillary electric energy device 70 is schematically illustrated as an electric storage battery, other electric energy storage devices can be utilized. By way of example, these would include flywheels, high energy capacitors and the like.

Energy storage and discharge system 69 is connected to controller 40 across a voltage bus. Energy storage and discharge system 69 includes preferably includes an off-load device (not shown) and ancillary energy storage and discharge switching devices (not shown). The off-load device may include an off-load resistor with associated switching devices which may include a charge switching device and a discharge switching device, for example.

A PWM inverter within controller 40 is used to convert the permanent magnet turbogenerator/motor output to utility power, either sixty hertz, three phase for operation in stand-alone operating modes, or as a current source device for grid-connect operating modes. According to the present invention, the dual mode controller communicates with control logic to automatically transition between SA and GC modes. As such, the PWM inverter is controlled to automatically transition between controlling voltage in SA modes to controlling current in GC modes. Of course other implementations are possible and the present invention is not limited to controlling voltage in SA modes and controlling current in GC modes.

The reconfiguration or conversion of the PWM inverter to be able to operate as a current source synchronous with the utility grid may be accomplished in one embodiment according to the present invention by first stopping the PWM inverter. The AC output or the grid connect point is monitored with a separate set of logic to detect the rotation sequence and reference phase angle of the utility grid. When the control logic detects that the grid is fit for reconnection, it will wait for a configurable reconnection delay and then initiate a transfer to grid connect mode. The transfer starts with the gradual resynchronization of the stand-alone angle (phase) reference to the grid angle reference. Once the system is resynchronized to the grid, it will be able to run the stand-alone controls while the isolating device (motorized circuit breaker or contactor) is closing. Once the isolating device has been verified closed using an auxiliary contact, for example, the system will transition directly from the stand-alone load state to the grid-connect load state. If grid connect operation is not requested, or if closure verification is not timely received (such as within 100 milliseconds, for example), the system may transition into a cool-down state. In either case, the auxiliary storage and discharge system is recharged before the system is automatically shutdown.

Dual mode control according to the present invention may be used to provide for momentary transitions between GC and SA operating modes. To reduce the transition time and provide only a momentary break in power to the protected load, the present invention utilizes the auxiliary power storage and discharge system 69 to provide power during the transition. To activate this option, auxiliary power storage and discharge system 69 is operated in a grid-connected charging mode during the grid-connected load state to assure immediate and sufficient power availability. The turbogenerator/motor may be kept in a lit state to facilitate more immediate transfers with speed controlled using the off-load device. The lit transfer state provides additional time to initialize the auxiliary power storage and discharge system 69. Using a motorized circuit breaker or contactor, the momentary break or interruption in power could be as short as 100 milliseconds. Alternatively, using a series combination of an electronic contactor and mechanical contactor or circuit breaker, the break time could be reduced to less than a cycle using the high bandwidth digital communications interface, for example (RS-485), between dual mode controller 90 and generator controller 40.

Ancillary electric storage device 70 can continue motoring turbogenerator 10 for a short time after a shutdown in order to cool down turbogenerator 10 and prevent unwanted heat recovery from recuperator 15. By continuing the rotation of turbogenerator 10 for several minutes after shutdown, power head 13 will keep moving air and sweep heat away from permanent magnet generator 12 to keep heat in the turbine end of power head 13. Preferably, the present invention provides a cool-down mode and a warm-down mode depending upon the particular operating conditions and whether it is desirable to quickly restart the turbine.

Battery switching devices associated with ancillary electric storage device controller 71 provide a bi-directional path between ancillary electric storage device 70 and generator controller 40. Ancillary electric storage device 70, which is preferably a bank of independently connectable batteries, can provide energy when a sudden demand or load is required and the gas turbine is not up to speed.

Figure 3:
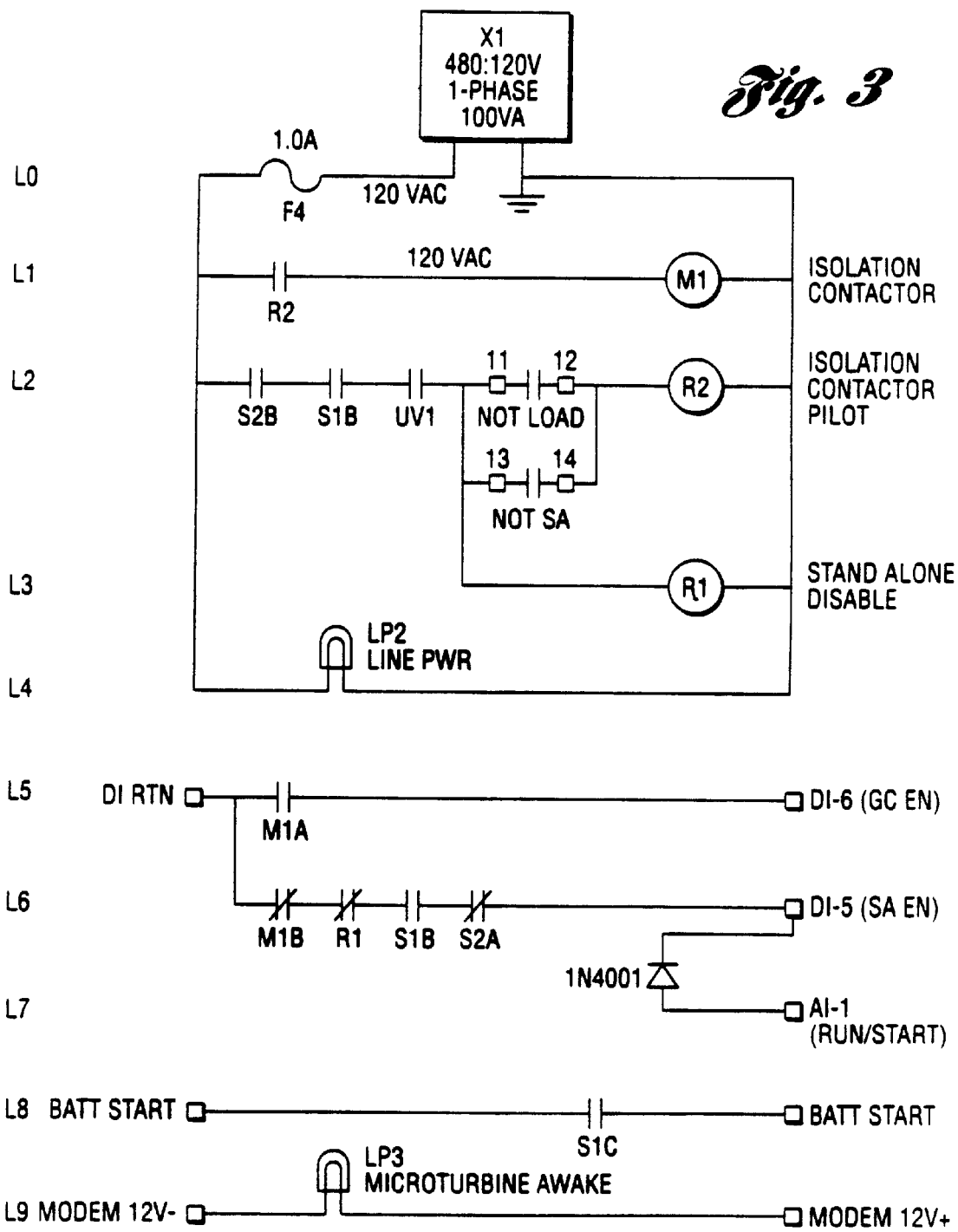
FIG. 3 is a block diagram illustrating additional details of a dual mode controller for one embodiment of a dual mode turbogenerator/motor system according to the present invention.

FIG. 3 is a block diagram illustrating additional details of a dual mode controller for one embodiment of a dual mode turbogenerator/motor system according to the present invention. According to the present invention, a dual mode controller allows a turbogenerator/motor to automatically transition from a grid connect operating mode to a stand alone operating mode when a utility outage occurs. Parallel connected protective modes are then powered by the turbogenerator/motor (operating in stand alone mode) during the utility power outage. When utility power is restored, the dual mode controller can be set to automatically return the turbogenerator/motor to grid connect service. The dual mode controller according to the present invention also allows the turbogenerator/motor to be used as an automatically dispatched standby generator.

The dual mode controller of the present invention may be used in various applications operating in a standby only mode or a standby/grid connect mode, for example. When operating in a standby only application, the turbogenerator/motor is used as a standby generator. During a utility outage, the turbogenerator/motor and parallel connected protected loads are isolated from the grid and the turbogenerator/motor powers the protected loads. When utility power is restored, the turbogenerator/motor automatically shuts down and the protected loads return to utility power.

For standby/grid connect applications of the dual mode controller the turbogenerator/motor is normally operated in a grid connect mode to reduce power draw from the utility. During a utility outage, the turbogenerator/motor is used to power the parallel connected protected loads. When utility power is restored, the protected loads return to utility power and the turbogenerator/motor automatically returns to grid connect mode.

In one embodiment of the present invention, the dual mode controller includes user controls to select the available operating mode or modes. The primary user control is preferably a selector switch which determines the overall dispatch mode for the turbogenerator/motor. Representative operating modes may include an automatic mode in which the turbogenerator/motor is automatically dispatched in grid connect mode when the utility lines are energized and automatically transitions to stand alone mode during a utility outage. A turbogenerator/motor power mode may be provided in which the turbogenerator/motor may be dispatched in stand alone mode only. The turbogenerator/motor output and parallel connected protected loads will be electrically isolated from the utility lines. A line power mode may be provided in which the turbogenerator/motor may be dispatched in grid connect mode only. During a utility outage, the turbogenerator/motor will shut down and the protected loads not be powered.

The embodiment of a dual mode controller according to the present invention illustrated in FIG. 3 preferably includes three indicator lights mounted on the dual mode controller. A load power light (not shown) is illuminated when the loads are energized by either the turbogenerator/motor or the utility grid. A line power light (LP2) is illuminated when the utility grid is energized. A turbogenerator/motor awake light (LP3) is illuminated when the turbogenerator/motor controls are energized.

Two user controls mounted on the dual mode controller manage operation of the turbogenerator/motor. A power switch (S1) is preferably a keyed switch with on and off positions in addition to a momentary compact position. The contact status for the three contacts provided by power switch S1 are summarized in the table of FIG. 3. As illustrated, the dual mode controller (and thus the turbogenerator/motor and its parallel connected protected loads) may be switched on or off using power switch S1. The momentary contact position may be used to awaken the turbogenerator/motor from its battery-saving "sleep" state.

A mode select switch (S2) is provided to select the allowed operating modes for the particular application of the turbogenerator/motor and its parallel connected protected loads. A table summarizing the context for the mode select switch is also provided in FIG. 3.

In operation, when power switch S1 is in the off position, contacts S1A, S1B, and S1C are open preventing operation of the turbogenerator/motor. When power switch S1 is in the on position or momentary contact awake position, contacts S1A and S1B are closed which allows operation of the turbogenerator/motor provided additional contacts are in the appropriate state as described below. In the momentary contact awake position, contact S1C is closed and the turbogenerator/motor controls are powered up by the transient battery system.

When mode switch S2 is in the "line" position, contact S2A is open and contact S2B is closed. This allows the turbogenerator/motor to be operated only in the grid connect mode. If there is a utility outage, the turbogenerator/motor will shut down. When the mode switch is in the auto position, contacts S2A and S2B are closed. In this mode, the turbogenerator/motor will be automatically dispatched in grid connect mode when the utility lines are energized and automatically transitioned to stand alone mode during a utility outage. When the mode switch S2 is positioned in the "turbine" mode, contact S2A is closed while contact S2B is open. In this mode, the turbogenerator/motor may be operated only in stand alone configuration. The turbogenerator/motor output will be physically isolated from the utility lines.

The following sequence of events provides a representative automatic transfer from grid connect (GC) mode to stand alone (SA) mode.

1. Utility outage begins. The under voltage relay in the dual mode controller senses the loss of grid voltage and opens (ref. contacts UV1, L2).

2. Power to the control relays (R1, L3 and R2, L2) is removed, opening their respective contacts.

3. The R2 contacts open (L1), removing power from the main isolation contactor coil (M1). The isolation contactor opens, isolating the turbogenerator/motor and protected loads from the utility lines.

4. A set of auxiliary contacts on the isolation contactor also open (M1A, L5) and turbogenerator/motor GC operation is disabled. Another set of auxiliary contacts close (M1B, L6) which, if S1B, S2A, and R1 are closed, closes the turbogenerator/motor's SA enable contacts, permitting SA operation.

5. The turbogenerator/motor initiates an orderly shutdown (warm-down). (This shutdown may have been triggered by the protective relay functions of the turbogenerator/motor, before the under voltage relay tripped.)

6. The turbogenerator/motor "Not Load" relay closes "not Load", 11 and 12, L2), which is of no consequence at this particular point in the sequence.

7. The turbogenerator/motor completes its warm-down cycle (4–6 minutes depending on ambient temperature) and enters and GC standby state. Immediately, since the GC enable contacts are open (L5), it enters the disabled state. Again, immediately, since the SA enable contacts are closed (L6), it enters the SA standby state and the "Not SA" relay contacts (13 and 14, L2) open.

8. If the dispatch mode active for stand alone calls for it, and the auto restart feature in the turbogenerator/motor is enabled, it initiates a restart in SA mode, which will require approximately two minutes.

9. After the stand along start sequence is completed, the auto load feature of the turbogenerator/motor, if enabled, connects the turbogenerator/motor output to the protected loads and the "Not Load" relay (11 and 12, L2) opens, preventing the isolation contactor from connecting the grid to the turbogenerator/motor and protected loads for as long as the turbogenerator/motor is in the load state.

The following representative sequence of events occurs during an automatic transfer from grid connect mode to stand alone mode.

1. Utility outage ends. Following a time delay set in the under voltage relay, its contacts close (UV1, L2).

2. If S2B and S1A are closed, power to the SA disable relay coil (R1) is restored, opening its contacts (R1, L6), disabling SA operating.

3. The turbogenerator/motor initiates an orderly shutdown. The turbogenerator/motor state changes from load to not load, closing the "Not Load" relay contacts in the turbogenerator/motor (11 and 12, L2).

4. The isolation contactor pilot relay coil (R2, L2) energizes, closing its contacts (R2, L1). The isolation contactor (M1) closes connecting the utility lines to the protected load(s) and the turbogenerator/motor (elapsed time since return of utility—approximately 10 seconds).

5. After the turbogenerator/motor completes a battery recharge phase and a warm-down cycle (up to 32 minutes depending on ambient temperature and the state of the battery charge), it enters the SA standby state. Immediately, since the SA enable circuit (L6) is open, it enters the disable state. The "Not SA" relay contacts open (13 and 14, L2). Again immediately, since the GC enable circuit is closed (L5), it enters the GC standby state.

6. If the dispatch mode active for grid connect calls for it, and the auto restart feature in the turbogenerator/motor is enabled, it initiates a restart in GC mode, which will require approximately two minutes.

Figure 4:
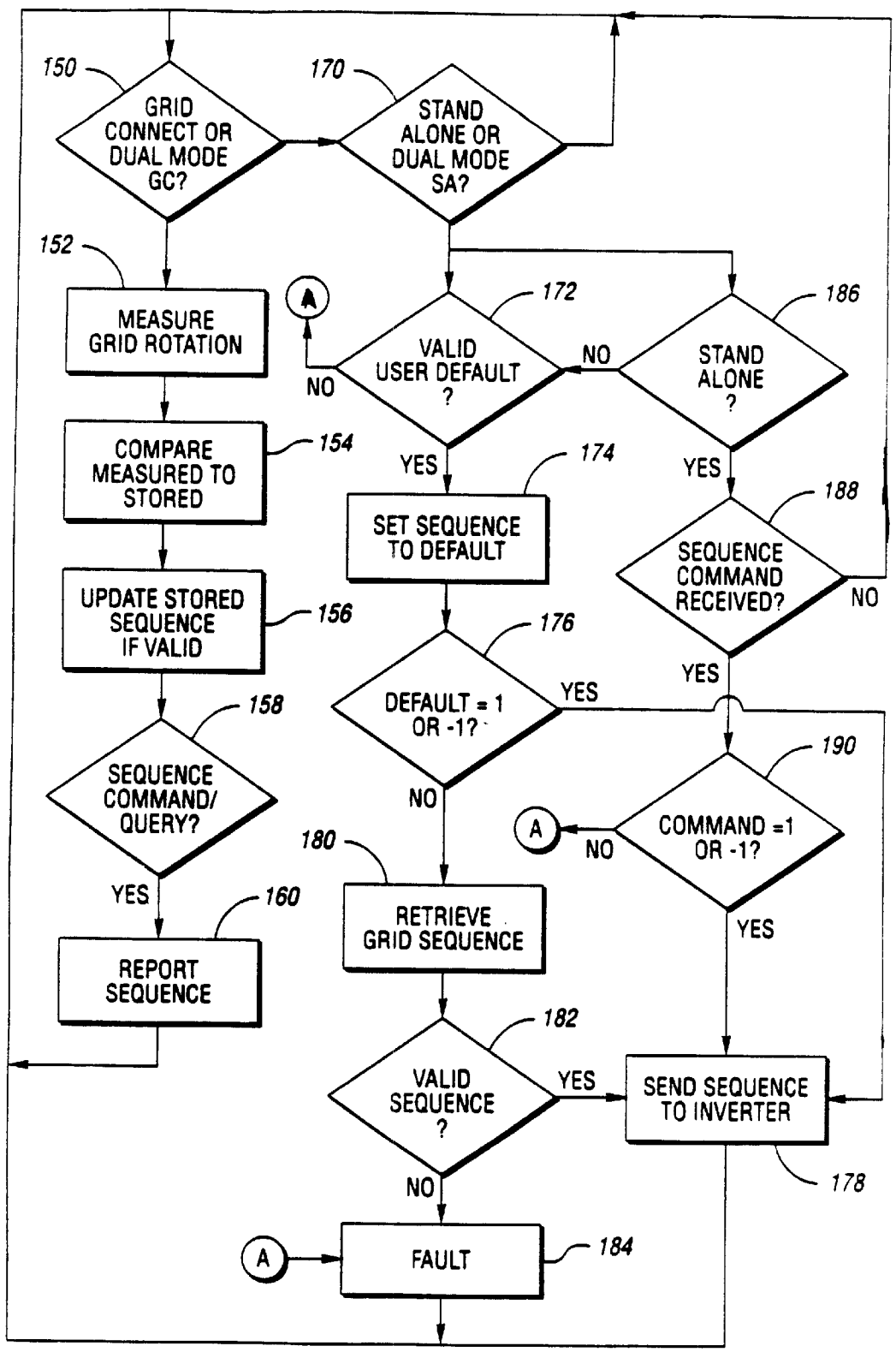
FIG. 4 is a simplified flowchart illustrating the rotation sequence measurement and control logic used by a dual mode turbogenerator/motor system according to the present invention.

FIG. 4 is a diagram illustrating operation of rotation sequence control for one embodiment of a dual mode controller for a turbogenerator/motor according to the present invention. Block 150 of FIG. 4 represents determining whether the system is currently operating in grid connect or dual mode-grid connect operating mode. When operating in the grid connect or dual mode grid-connect state, the system has the ability to measure the rotation sequence of the utility grid as represented by block 152. This allows the same rotation sequence to be used in the grid connect and stand-alone modes as described above. This will prevent possible equipment damage for the protected load due to a potential phase sequence reversal when transferring between grid connect and stand-alone operating modes.

Block 154 compares the measured rotation sequence with a previously stored value which is preferably stored in a persistent memory. If the currently measured grid rotation sequence differs from the previously stored value, and if the current value is valid, i.e. can be measured, block 156 updates the rotation sequence value by storing the current value in the persistent memory. If a valid measurement of the grid rotation sequence has not yet been made, an appropriate value is stored, such as zero for example. In one preferred embodiment of the present invention, a first value is used to indicate a positive rotation sequence (L1, L2, L3) while a second value is used to indicate a negative rotation sequence (L1, L3, L2).

The present invention provides the capability to send a rotation sequence command or query as represented by block 158. If operating in the grid connect or dual mode grid-connect state, the rotation sequence cannot be changed since the system is connected to the utility grid. As such, the sequence command is treated as a query and the last measured rotation sequence is reported as represented by block 160. Preferably, queries and/or commands may be transmitted to and from the system over an RS-232 communications link.

If the system is not operating in a grid connect operating mode as determined by block 150, block 170 determines whether the system is operating in stand-alone or dual mode stand-alone. Preferably, each time the system enters the stand-alone state machine, a stored default rotation sequence will be retrieved as represented by block 172. This can occur either at power-up, or on transition from the grid-connected dual mode state. Block 174 of FIG. 4 sets the rotation sequence to the retrieved default value. Block 176 determines whether the default value corresponds to positive or negative rotation. If positive or negative rotation is indicated, the appropriate rotation sequence command is sent to the inverter as indicated by block 178. The present invention also allows a default value corresponding to the current or last-measured rotation sequence of the utility grid. If the default value corresponds to the grid rotation sequence, control passes to block 180 where the last-measured and/or stored grid sequence is retrieved. Block 182 determines whether the stored grid sequence is valid. If not, the system generates a fault as indicated by block 184. An invalid grid rotation sequence may result if the grid rotation sequence has not yet been measured, for example. If the retrieved grid rotation sequence is valid, an appropriate sequence command is sent to the inverter as indicated by block 178.

In addition to providing a default rotation sequence for operation in dual mode stand-alone configuration, the present invention also provides rotation sequence control outside of dual mode operation. When not operating in dual mode, and currently in the stand-alone mode as indicated by block 186, block 188 awaits receipt of a rotation sequence command from the user. In one preferred embodiment, the rotation sequence command is provided via an RS-232 communications link to allow the user to set the rotation sequence. Block 190 determines whether the received rotation sequence command is valid. If the command includes an appropriate parameter to set the sequence to positive or negative, the corresponding sequence command is sent to the inverter as indicated by block 178. Otherwise, if block 190 determines the command is invalid, a fault is generated as indicated by block 184.

Figure 5:
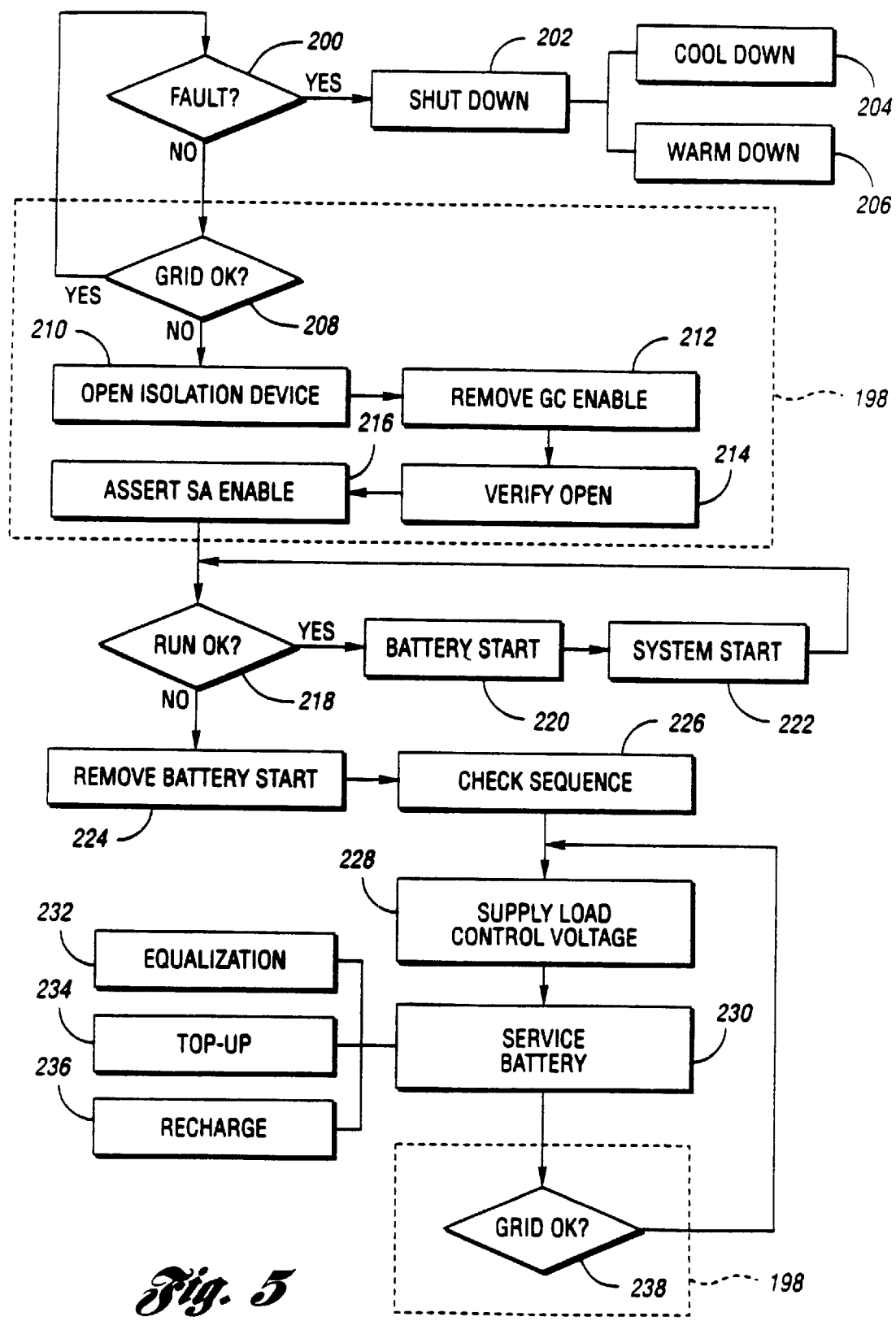
FIG. 5 is a simplified flow chart illustrating dual mode control of a transition from a grid-connect mode to a stand-alone mode according to the present invention.

FIG. 5 is a simplified flowchart illustrating dual mode control of a turbogenerator/motor during a transition from a grid-connect mode to a stand-alone mode according to the present invention. Functions enclosed by dashed lines 198 are preferably performed by the dual mode controller/sub-assembly while the remaining functions illustrated are preferably performed by the turbogenerator/motor controller/sub-assembly. The dual mode controller monitors the utility grid and, when necessary, operates an isolation device to separate or isolate the turbogenerator/motor and parallel connected loads using either a contactor or a motorized circuit breaker as described above. For implementations which utilize an external dual mode controller, the external controller preferably interfaces with the generator controller of the turbogenerator/motor by exchanging signals for battery start and system start/stop inputs in addition to standby, run, load, and fault state indicators. An external dual mode controller may also communicate grid-connect enable, stand-alone enable, and synchronization signals to the generator controller. This enables an external dual mode control system to start the turbogenerator/motor system in the event that it was not operating in the grid-connect load state when a grid interruption occurred.

If the system detects a fault as represented by block 200, a shutdown 202 may be initiated. Depending upon the severity of the fault, shutdown 202 may be performed using a cool down 204 routine or a warm down 206 routine. Block 208 monitors the utility grid and provides an appropriate indication of grid loss or a grid fault. Various grid monitoring systems and methods may be used without departing from the spirit or scope of the present invention to determine the availability or condition of the utility grid power.

When a grid interruption is detected by block 208, block 210 opens the isolation device to isolate the turbogenerator/motor and parallel connected protected load from the utility grid. An appropriate status indicator is set to indicate that the grid-connect mode is no longer enabled as represented by block 212. An auxiliary contact or similar device is used to confirm that the isolation device has actually opened as commanded as represented by block 214. The stand-alone enable signal is then asserted as represented by block 216. Block 218 determines whether the turbogenerator/motor is in the run state. Depending upon the particular application, transition from the grid-connect load state to the stand-alone load state may take several minutes, during which time the protected load will receive no power. In this case, the turbogenerator/motor is not in the run state when transitioning from the grid-connect mode. As such, block 220 commands a battery start and block 222 commands a system start. The turbogenerator/motor is operated as a motor with a variable speed drive function provided by the PWM inverter until the turbogenerator/motor reaches self-sustaining operation as indicated by block 218.

Block 224 removes the battery start signal and block 226 determines the appropriate rotation sequence for the three-phase power to be supplied by the generator and PWM inverter. The inverter is then appropriately reconfigured to supply the load and control the voltage as represented by block 228. The auxiliary energy storage device, or battery bank in this example, is then serviced as represented by block 230. Depending upon the particular operating conditions, this may include performing an equalization charge 232, a top-up charge 234, or a recharge 236. Proper maintenance of the auxiliary electrical storage and discharge system provides for faster transitions in dual mode and lowers the risk of the storage device becoming depleted when the system is operating in a grid-connected mode. The grid is continually monitored to determine whether a transition back to grid-connect mode may be performed, assuming the dual mode controller is appropriately configured, as represented by block 238.

Figure 6:
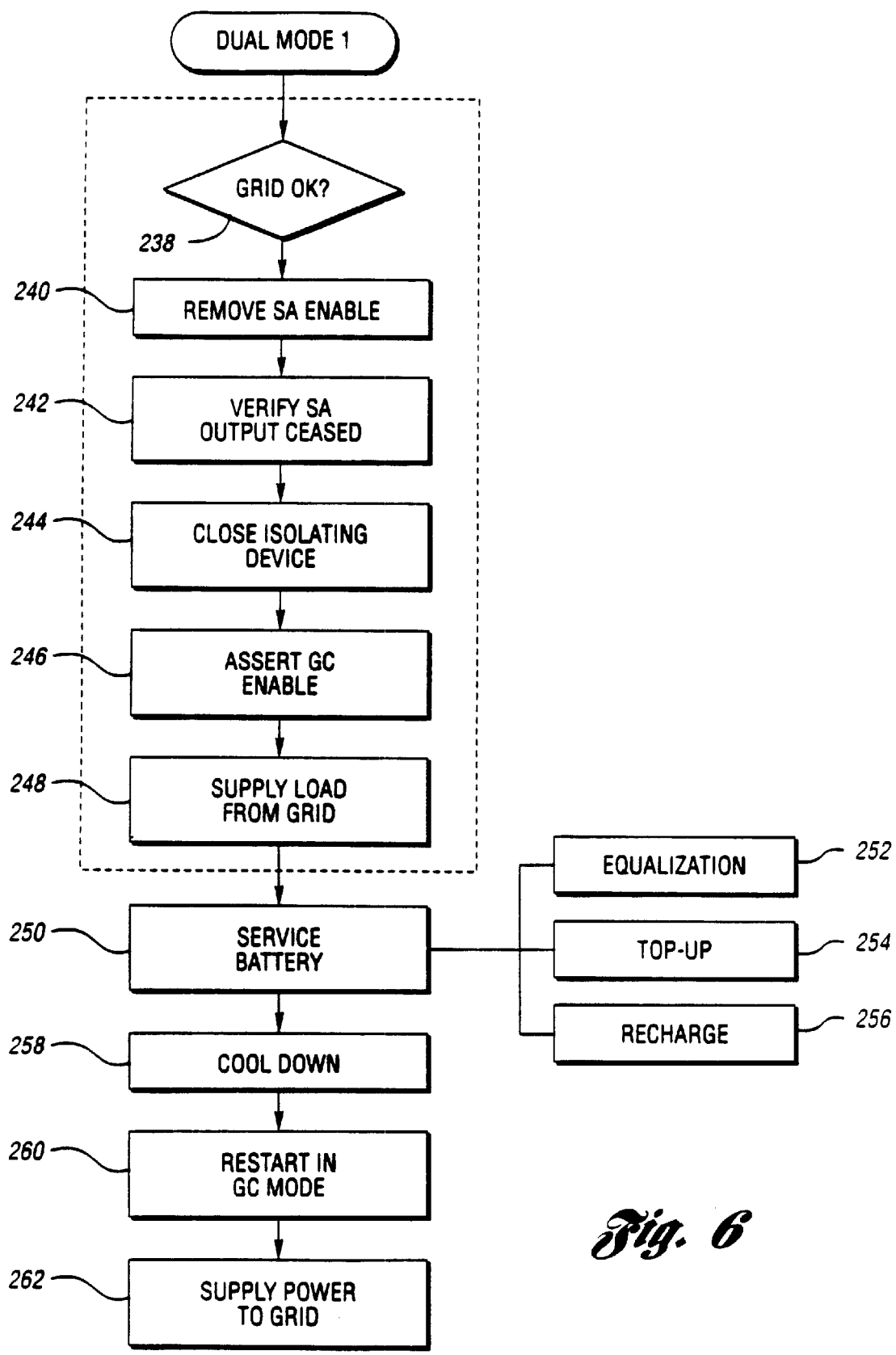
FIG. 6 is a simplified flowchart illustrating dual mode control without resynchronization and with a stop and automatic restart for a transition from stand-alone mode to a grid-connected mode according to the present invention.

FIG. 6 provides a simplified flowchart illustrating one embodiment of a dual mode controller operating without resynchronization and with stop and automatic restart (Dual Mode 1) during a transition from a stand-alone mode to a grid-connect mode according to the present invention. FIG. 6 assumes the system is operating in stand-alone mode beginning with block 238 of FIG. 5 where the grid is monitored to determine if reconnection is appropriate. If reconnection is appropriate as indicated by block 238, block 240 removes the stand-alone (SA) enable logic signal. Block 242 verifies that the stand-alone output has ceased. Block 244 closes the isolating device to reconnect the parallel-connected protected load with the utility grid. Block 246 asserts or energizes the grid connect (GC) enable signal once the isolating device is verified closed using an auxiliary contact and the protected load is supplied from the grid as indicated at block 248. If grid-connect operation is not requested, or if the closure of the isolating device cannot be verified within a predetermined time, a fault will be generated and the system will transition to a cool down mode (not shown). In either case, the auxiliary electrical energy storage and discharge system is serviced as represented by block 250. This may include an equalization charge 252, top-up charge 254, or recharge 256, for example. A cool down is then performed as represented by block 258. Block 260 performs an automatic restart in grid connect mode and supplies power to the utility grid as represented by block 262.

Figure 7:
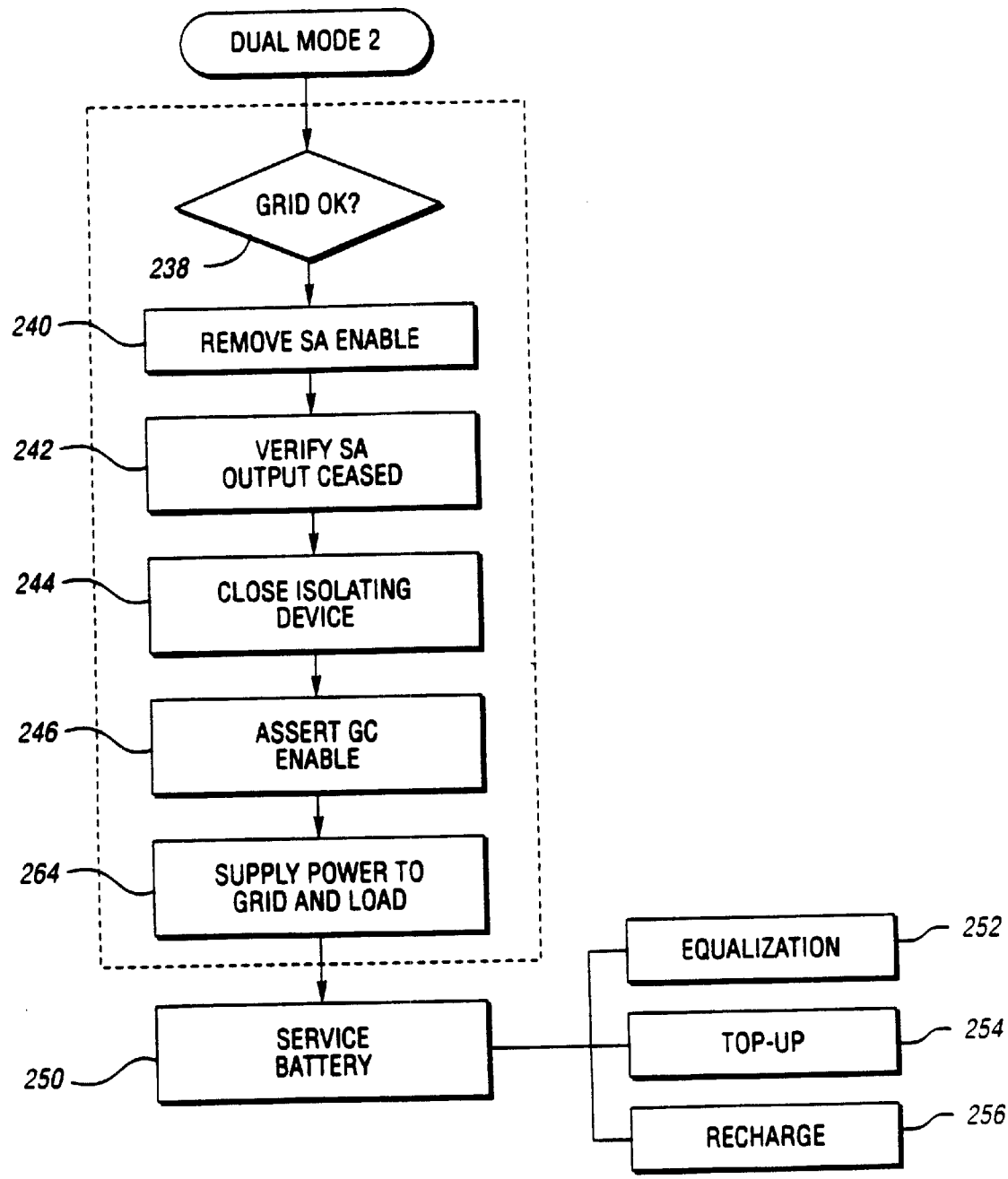
FIG. 7 is a simplified flowchart illustrating dual mode control without resynchronization and without a stop and automatic restart for a transition from stand-alone mode to a grid-connected mode according to the present invention.

FIG. 7 provides a simplified flowchart illustrating one embodiment of a dual mode controller operating without resynchronization and without stop and automatic restart (Dual Mode 2) during a transition from a stand-alone mode to a grid-connect mode according to the present invention. FIG. 7 assumes the system is operating in stand-alone mode beginning with block 238 of FIG. 5 where the grid is monitored to determine if reconnection is appropriate. Blocks 240, 242, 244, and 246 perform functions as described above with reference to FIG. 6. After asserting the grid-connect (GC) enable signal in block 246, power is supplied to the utility grid and to the protected load as represented by block 264. The auxiliary electric energy storage device is then serviced as represented by blocks 250, 252, 254, and 256 as described above.

Figure 8:
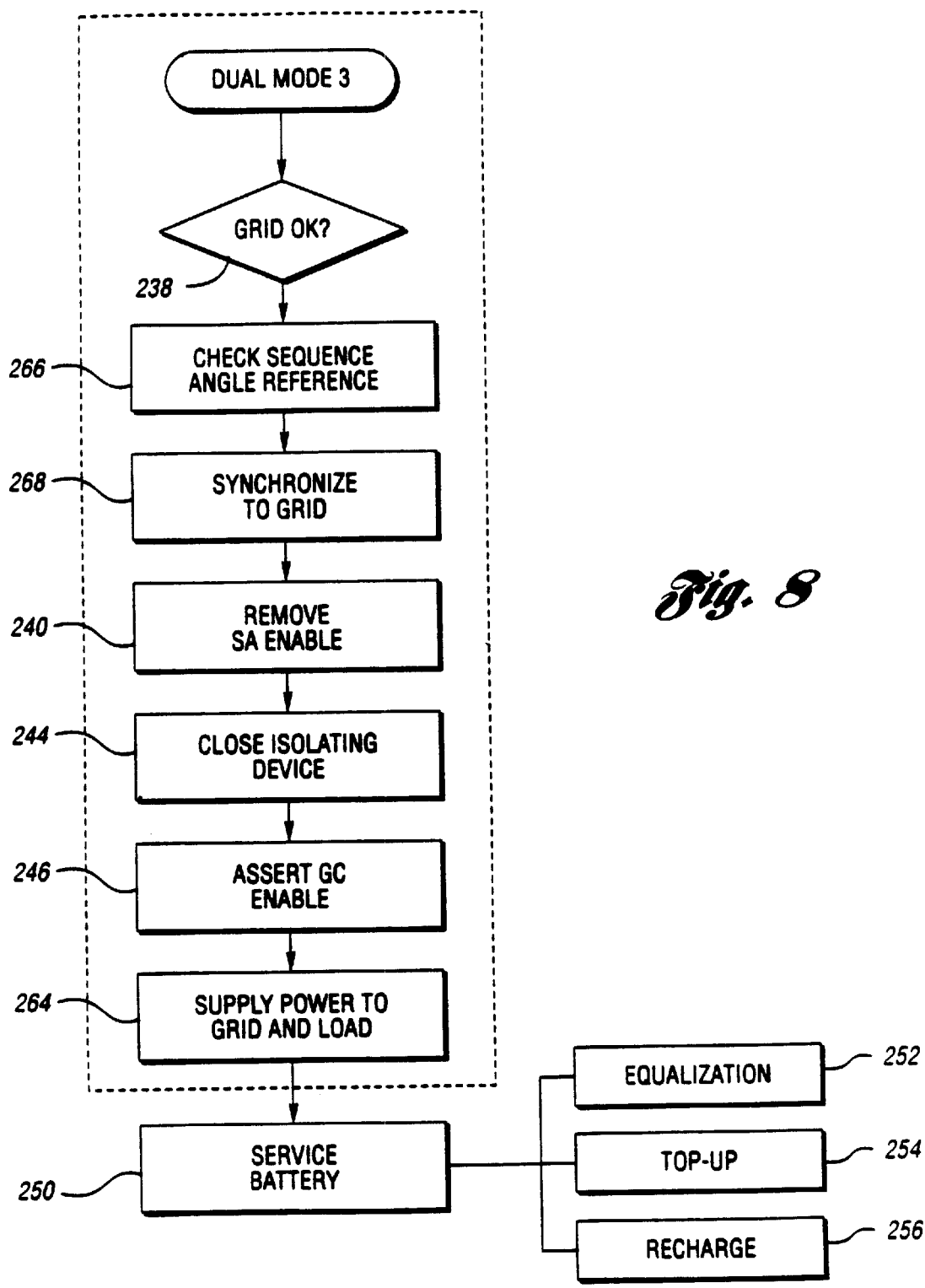
FIG. 8 is a simplified flowchart illustrating dual mode control with resynchronization and without a stop and automatic restart for a transition from stand-alone mode to a grid-connected mode according to the present invention.

FIG. 8 provides a simplified flowchart illustrating one embodiment of a dual mode controller operating with resynchronization and without stop and automatic restart (Dual Mode 3) during a transition from a stand-alone mode to a grid-connect mode according to the present invention. FIG. 8 assumes the system is operating in stand-alone mode beginning with block 238 of FIG. 5 where the grid is monitored to determine if reconnection is appropriate. When reconnection to the grid is appropriate in this mode, the grid rotation sequence and phase reference angle are detected as represented by block 266. The generator controller then adjusts the rotation sequence and/or phase reference angle if required to synchronize to the grid as represented by block 268. Operation then continues with blocks 240, 244, 246, 264, 250, 252, and 254 as described above. However, the output from the generator controller is not interrupted in the transition between stand-alone and grid-connected modes.

Figure 9:
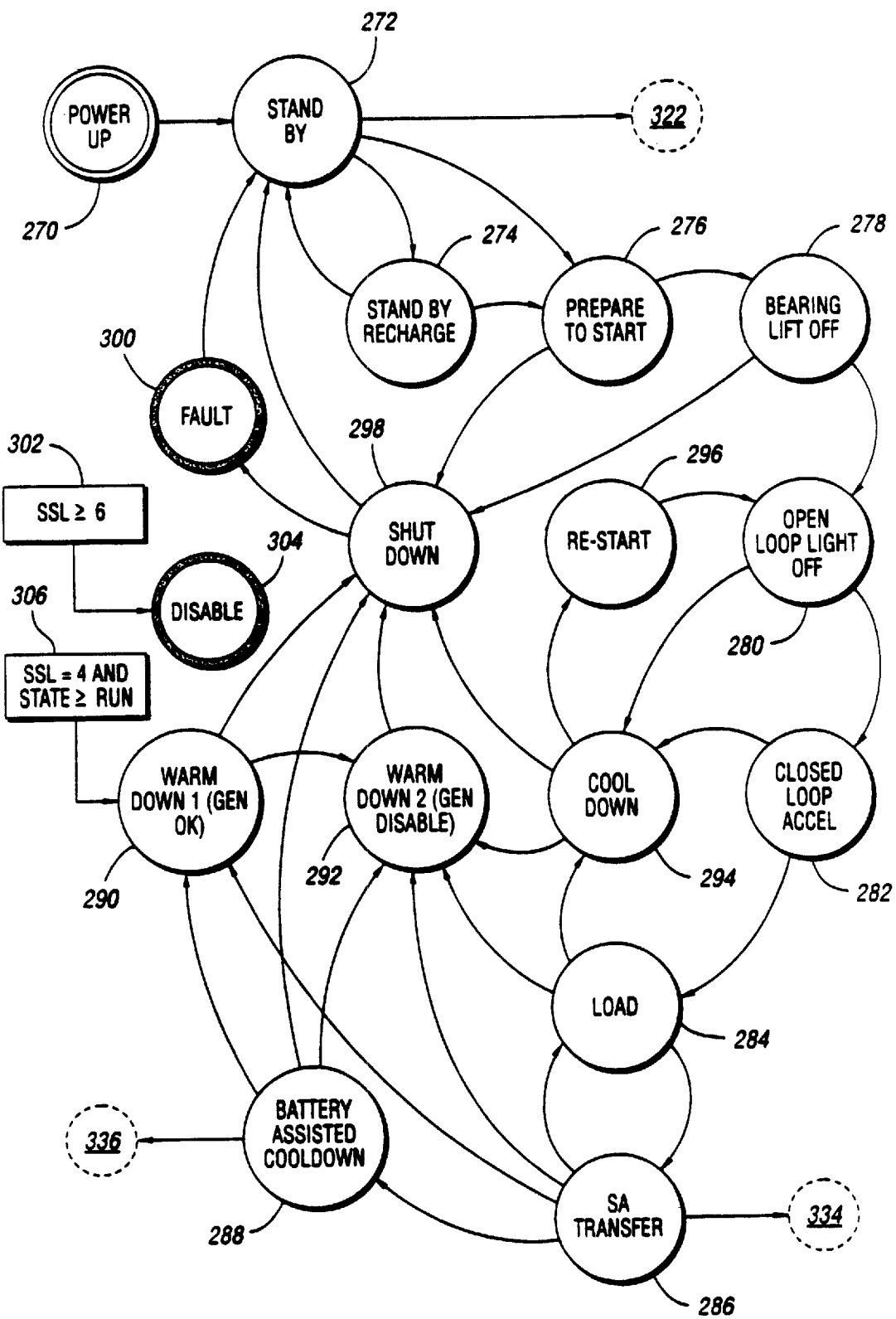
FIG. 9 is a state transition diagram illustrating operation of a dual mode control system in the grid-connect mode including states for transitioning from grid-connect mode to stand-alone mode according to the present invention.

FIG. 9 provides a state transition diagram illustrating representative states for operation of a dual mode control system in the grid-connect mode, including states for transitioning from grid-connect mode to stand-alone mode according to the present invention. As will be appreciated by those of skill in the art, the state transition diagrams of FIGS. 9 and 10 do not necessarily represent all possible states or transitions between states but are provided to illustrate the most common states for operation of a turbogenerator/motor in a representative application utilizing dual mode control according to the present invention. Various states of the automatic dual mode may be common to a corresponding manual transition operating mode active when the system is not operating under dual mode control. For example, various states of FIG. 9 may be common to the manual grid-connect mode and automatic or semiautomatic dual mode operation.

Initial power-up 270 transitions to standby 272 upon passing various power-on self tests (POSTs). Grid-connect standby 272, upon meeting appropriate exit conditions, may transition to standby recharge state 274, prepare-to-start state 276, or to stand-alone standby state 322 (best illustrated in FIG. 8). Transition from standby state 272 to standby recharge state 274 is performed if the auxiliary storage system indicates a charge is needed. Once charged, the state may return to standby state 272. If a start command is received while in state 272 or 274, prepare-to-start state 276 is entered. In a normal start-up, the states proceed through bearing liftoff 278, open loop light-off 280, and closed loop acceleration 282 until the turbogenerator/motor reaches an appropriate operating speed and temperature which allows it to enter the load state 284. Various conditions occurring between the prepare-to-start state 276 and load state 284 may result in appropriate corrective action such as a cool down 294, restart 296, or shutdown 298. Depending on the particular anomaly and corresponding severity, the system may reenter standby 272 from shutdown state 298, may generate a fault 300, or for some conditions may result in entering a disable state 304, such as when an appropriate status or fault code is indicated as represented by block 302. Once in fault state 300, some faults may be cleared and the system returned to standby state 272 after an appropriate reset period. Likewise, after the system enters shutdown state 298 and the shaft stops rotating, the system may return to standby state 272.

Under normal operating conditions, dual mode grid-connect load state 284 may transition to stand-alone transfer state 286 when a grid fault is detected or when the dual mode controller status flags or enable signals are inconsistent with grid-connected operation. This may occur anytime that the stand-alone enable signal is set, the grid-connect enable signal is not set, or when a grid fault is received. Upon entry into state 286, the PWM inverter is preferably disabled and reset. The auxiliary power storage and discharge system is enabled and set to regulate the DC bus. After resetting the PWM inverter, the appropriate parameters are loaded to reconfigure the PWM inverter as a grid-connected AC current source. A stand-alone auto-restart timer is then reset to zero. If the grid-connect enable signal returns to a valid state, state 286 transitions back to the load state 284. If the stand-alone mode logic signal is set and a valid start command has been received, the system transitions to stand-alone run mode 334 (best illustrated in FIG. 8). In a fully automatic mode, a transition from state 286 to 334 is performed if an auto restart enable flag is set and a delay timer has expired. In a semi-automatic mode, the system may wait for a start command from the user/operator. Once the auxiliary power storage and discharge system has entered the regulate DC bus mode, the PWM inverter is loaded with the stand-alone parameters to reconfigure the inverter for stand-alone operation where the voltage is controlled. The system then enters the stand-alone run state 334.

From transfer state 286, various conditions may cause the system to enter battery assisted cool down state 288, a first warm down state 290, or a second warm down state 292. For example, if a user selectable transition time is exceeded while in state 286, the system may transition to battery assisted cool down state 288. Likewise, if a stop command is received, the system transitions to state 288. In each of the cool down and warm down states 288, 290, 292, and 294, the turbogenerator/motor fuel system is shut down and the turbogenerator begins to decelerate. Battery assisted cool down state 288 may supply power to the motor to maintain circulation of air through the turbogenerator and remove heat from the recuperator as described above. The system may transition to the stand-alone cool down state 336 (best illustrated in FIG. 10), or to the warm down states 290, 292, or shut down state 298.

Figure 10:
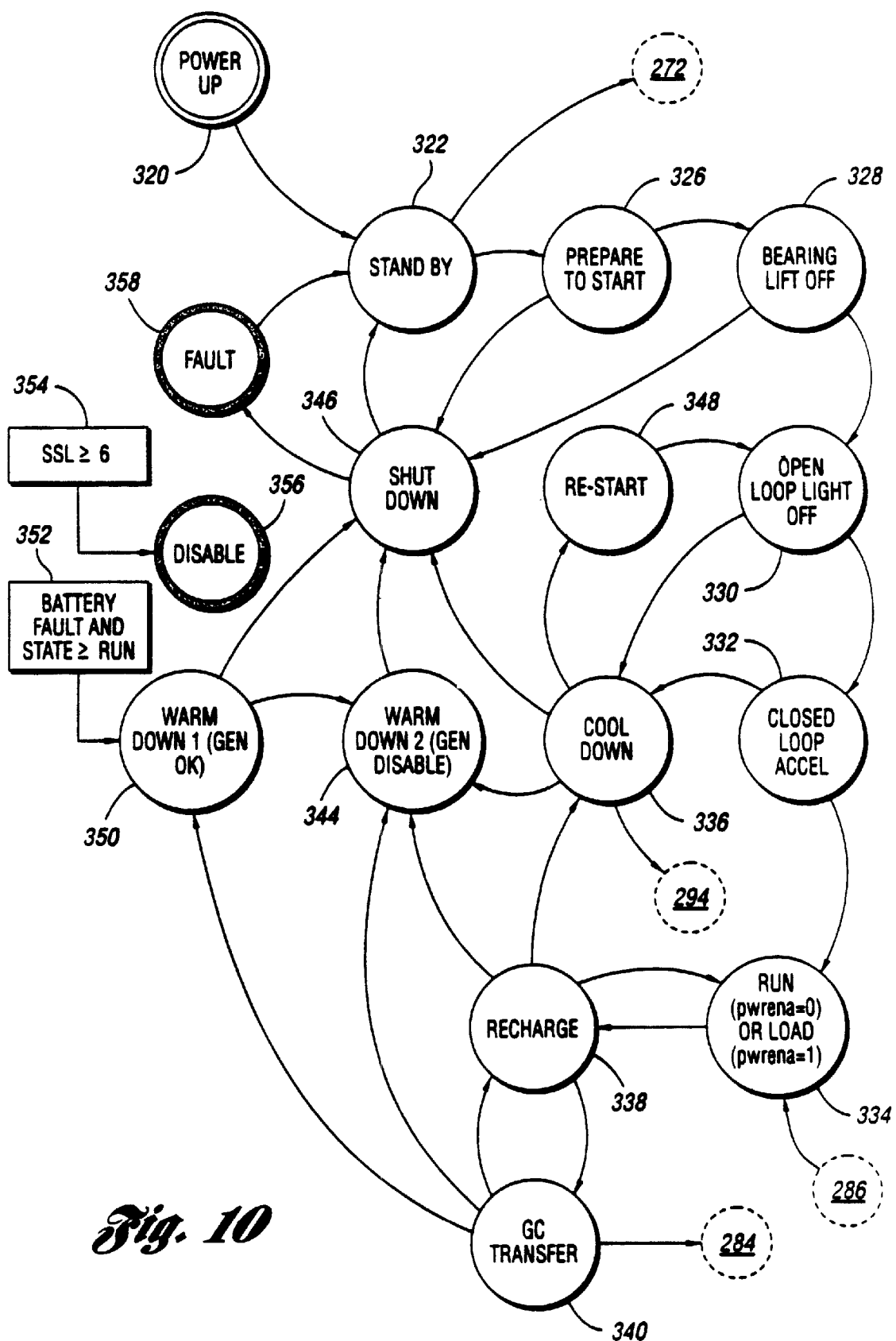
FIG. 10 is a state transition diagram illustrating operation of a dual mode control system in the stand-alone mode including states for transitioning from the stand-alone mode to the grid-connect mode according to the present invention.

FIG. 10 provides a representative state transition diagram illustrating operation of one embodiment for a dual mode control system in the stand-alone mode including states for transitioning from the stand-alone mode to the grid-connect mode according to the present invention. As with the state transition diagram of FIG. 9, FIG. 10 illustrates the most common states and transitions for a representative application. However, the present invention is independent of the particular states and/or transitions including entry and exit conditions which are provided for ease of illustration and explanation only. Likewise, various states illustrated in FIG. 10 may be common to a manual or semi-automatic stand-alone mode which may require some intervention from an operator/user to complete the transition between operating modes.

A typical operating sequence may proceed through power-up state 320 to standby state 322 after passing the POST. Transition from standby state 322 may proceed to grid-connect standby state 272 (FIG. 9) during a mode transition between stand-alone and grid-connect modes. A typical start-up sequence proceeds through prepare-to-start state 326 where the turbogenerator/motor is operated as a motor with increasing shaft speed, bearing lift off state 328 where the rotational speed is sufficient for proper operation and cooling of the foil bearings, open loop light-off state 330 where fuel is supplied to the combustor and the ignitor is energized to begin combustion, closed loop acceleration state 332, and run or load state 334. The run or load state 334 may be entered directly from the stand-alone transfer state 286 (FIG. 9). Various operating conditions may result in a system cool down 336, shutdown 346, or warm down 344, 350. Severe faults may result in entering the system disable state 356. After an appropriate reset period, some faults resulting in fault state 358 may be cleared and the system returned to standby state 322. Likewise, after the system enters shutdown 346 and the shaft stops rotating, the system may return to standby state 322.

Stand-alone run state 334 is the branch-in point for automatic transitions from the grid-connect to SA transfer state 286 (FIG. 9). If the system is appropriately configured, it will transition immediately into stand-alone load state 334. Additional requirements are described with respect to state 286 of FIG. 9.

Recharge state 338 of FIG. 8 can be entered from grid-connect transfer state 340 or run state 334. From state 334, if the stand-alone and grid-connect enable signals are in an invalid or inconsistent state for stand-alone operation, i.e. the stand-alone enable signal is not set or the grid-connect enable signal is set, or when an appropriate level of system fault status is encountered, the system transitions to recharge state 338. The system can exit from recharge state 338 into stand-alone grid-connect transfer state 340, warm down state 344, cool down state 336, or back to run state 334 depending upon the particular operating conditions.

Stand-alone grid-connect transfer state 340 disables the PWM inverter and resets any faults. The auxiliary power storage and discharge device is controlled as for the stand-alone recharge state 338. The generator controller controls the shaft speed of the turbogenerator and fuel control is set the same as in the stand-alone recharge state 338. A transition from recharge state 338 to transfer state 340 loads the PWM inverter with appropriate grid-connect parameters to reconfigure the converter to transition from stand-alone voltage control to grid-connect AC current control, however, the inverter is not enabled at this point. The system may transition from transfer state 340 to grid-connect load state 284 (FIG. 9) once the inverter has synchronized to the grid and a valid start command is received or auto restart is enabled.

As such, the present invention provides systems and methods for dual mode control of a turbogenerator/motor to transition between a utility grid connected mode and a stand alone operating mode. Appropriate rotation sequence and synchronization provides the capability for momentary transitions between a stand-alone, isolated mode and a grid-connected mode. An auxiliary energy storage and discharge system provides the necessary additional power for load transients, such as those occurring during transitions between modes.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling a turbogenerator and suppling power to a load, comprising:

(a) generating variable-voltage/variable-frequency electrical power with a permanent magnet turbogenerator the variable-voltage and the variable-frequency of the generated electrical power being dependent upon the output power level of the permanent magnet turbogenerator;

(b) converting the variable-voltage/variable-frequency electrical power to fixed-voltage/fixed-frequency electrical power with a generator converter capable of operating in one of a grid-connected mode and a stand-alone mode;

(c) supplying fixed-voltage/fixed-frequency electrical power from the generator converter and the permanent magnet turbogenerator to at least one of a utility electrical power source and a protected load when the generator converter is operating in the grid-connected mode;

(d) monitoring the utility electrical power source;

(e) automatically disconnecting the generator converter and the permanent magnet turbogenerator from the utility electrical power source upon detection of a fault in the utility electrical power source;

(f) automatically switching the operating mode of the generator converter from grid-connected mode to stand-alone mode upon detection of a fault in the utility electrical power source; and (g) supplying fixed-voltage/fixed-frequency electrical power from the generator converter and the permanent magnet turbogenerator to the protected load when the generator converter is operating in the stand-alone mode.

2. The method of claim 1, wherein step (d) comprises:
monitoring a phase rotation sequence of the utility electrical power source.

3. The method of claim 1, wherein step (d) comprises:
monitoring a phase reference angle of the utility electrical power source.

4. The method of claim 1, further comprising:

(h) detecting that the utility electrical power source is acceptable for reconnection of the generator converter and the permanent magnet turbogenerator; and (i) reconnecting the generator converter and the permanent magnet turbogenerator to the utility electrical power source.

5. The method of claim 4, further comprising:

(j) prior to step (i), adjusting the phase angle of the fixed-voltage/fixed-frequency electrical power from the generator converter and the permanent magnet turbogenerator so that the phase angle of the fixed-voltage/fixed-frequency electrical power is synchronized with the phase angle of the utility electrical power source.

6. The method of claim 5, further comprising:

(k) switching the operating mode of the generator converter from stand-alone mode to grid-connected mode.

7. A method for controlling a turbogenerator and supplying power to a load, comprising:

(a) providing power to a load from a utility electrical power source;

(b) providing power to the utility electrical power source from a turbogenerator;

(c) monitoring the utility electrical power source;

(d) disconnecting the load and the turbogenerator from the utility electrical power source upon detecting a fault in the utility electrical power source; and (e) after step (d), providing power from the turbogenerator to the load.

8. The method of claim 7, wherein step (c) comprises:
monitoring a phase rotation sequence of the utility electrical power source.

9. The method of claim 7, wherein step (c) comprises:
monitoring a phase reference angle of the utility electrical power source.

10. The method of claim 7, further comprising:

(f) upon detecting that the utility electrical power source is acceptable for reconnection of the turbogenerator, reconnecting the turbogenerator to the utility electrical power source and providing power to the utility electrical power source from the turbogenerator.

11. The method of claim 7, further comprising:

(g) prior to step (f), adjusting the phase angle of the electrical power of the turbogenerator so that the phase angle of the electrical power is synchronized with the phase angle of the utility electrical power source.

12. A method for controlling a turbogenerator and suppling power to a load, comprising:

(a) generating electrical power with a turbogenerator, the electrical power having a voltage and a frequency that is dependent upon the output power level of the turbogenerator;

(b) converting the electrical power to fixed-voltage/fixed-frequency electrical power with a generator converter capable of operating in one of a grid-connected mode and a stand-alone mode;

(c) supplying fixed-voltage/fixed-frequency electrical power from the generator converter and the permanent magnet turbogenerator to at least one of a utility electrical power source and a protected load when the generator converter is operating in the grid-connected mode;

(d) monitoring the utility electrical power source;

(e) automatically disconnecting the generator converter and the permanent magnet turbogenerator from the utility electrical power source upon detection of a fault in the utility electrical power source;

(f) automatically switching the operating mode of the generator converter from grid-connected mode to stand-alone mode upon detection of a fault in the utility electrical power source; and (g) supplying fixed-voltage/fixed-frequency electrical power from the generator converter and the permanent magnet turbogenerator to the protected load when the generator converter is operating in the stand-alone mode.

13. The method of claim 12, further comprising:

(h) detecting that the utility electrical power source is acceptable for reconnection of the generator converter and the permanent magnet turbogenerator; and (i) reconnecting the generator converter and the permanent magnet turbogenerator to the utility electrical power source.

14. The method of claim 13, wherein step (d) comprises:
monitoring a phase reference angle of the utility electrical power source.

15. The method of claim 14, further comprising:

(j) prior to step (i), adjusting the phase angle of the fixed-voltage/fixed-frequency electrical power from the generator converter and the permanent magnet turbogenerator so that the phase angle of the fixed-voltage/fixed-frequency electrical power is synchronized with the phase angle of the utility electrical power source.

16. The method of claim 15, further comprising:

(k) switching the operating mode of the generator converter from stand-alone mode to grid-connected mode.

17. The method of claim 12, wherein step (d) comprises:
monitoring a phase rotation sequence of the utility electrical power source.

* * * * *